(12) United States Patent
Reznichenko et al.

(10) Patent No.: US 8,744,892 B2
(45) Date of Patent: Jun. 3, 2014

(54) AUTOMATED GENERATION OF ACCESS CONTROL POLICIES IN CROSS-ORGANIZATIONAL WORKFLOW

(75) Inventors: Yevgen Reznichenko, Hamburg (DE); Maarten E. Rits, Nice (FR); Jochen Haller, Karlsruhe (DE); Pascal T. C. Spadone, Antibes (FR); Cedric R. J. Hebert, Mouans-Sartoux (FR)

(73) Assignee: SAP AG, Walldorf (DE)

( * ) Notice: Subject to any disclaimer, the term of this patent is extended or adjusted under 35 U.S.C. 154(b) by 1887 days.

(21) Appl. No.: 11/356,531

(22) Filed: Feb. 17, 2006

(65) Prior Publication Data

US 2006/0253314 A1 Nov. 9, 2006

(30) Foreign Application Priority Data

May 3, 2005 (EP) ..................................... 05290969

(51) Int. Cl.
*G06Q 10/10* (2012.01)
(52) U.S. Cl.
USPC ......................................... 705/7.27; 705/7.13
(58) Field of Classification Search
CPC ............................. G06Q 10/10; G06Q 10/06
USPC .......................................... 705/9, 7.13, 7.27
See application file for complete search history.

(56) References Cited

U.S. PATENT DOCUMENTS

| 5,182,705 A | 1/1993 | Barr et al. |
| 5,301,320 A | 4/1994 | McAtee et al. |
| 5,535,322 A | 7/1996 | Hecht |
| 5,734,837 A | 3/1998 | Flores et al. |
| 5,870,545 A | 2/1999 | Davis et al. |
| 5,930,512 A | 7/1999 | Boden et al. |
| 5,937,388 A | 8/1999 | Davis et al. |
| 6,052,684 A | 4/2000 | Du |
| 6,067,548 A | 5/2000 | Cheng |
| 6,088,679 A * | 7/2000 | Barkley ...................... 705/7.26 |
| 6,408,337 B1 | 6/2002 | Dietz et al. |
| 6,601,233 B1 | 7/2003 | Underwood |
| 6,779,721 B2 | 8/2004 | Larson et al. |
| 6,934,932 B2 | 8/2005 | Dathathraya |
| 7,051,071 B2 | 5/2006 | Stewart et al. |

(Continued)

OTHER PUBLICATIONS

European Search Report for EP05290969, mailed Oct. 12, 2005, 7 pages.

(Continued)

*Primary Examiner* — Beth V Boswell
*Assistant Examiner* — Ernest A Jackson
(74) *Attorney, Agent, or Firm* — Blakely, Sokoloff, Taylor & Zafman (57) ABSTRACT

A method and system to control an interaction of a plurality of participants in a workflow process. The method classifies the plurality of activities as (1) first activity of the workflow process, (2) first activity of a participant in an on-going workflow process, and (3) interaction activity. A set of access control policies is generated for each type of activity. The policies include workflow initialization policy, participation policy and interaction policies. The policies determine if a requesting participant is permitted to interact with a responding participant. In addition, the system includes a policy enforcement point for receiving a request from a requesting participant, wherein the request is for activating an activity of a responding participant. The policy enforcement point forwards the request to a policy decision point where the request is evaluated based on the set of access control policies.

15 Claims, 7 Drawing Sheets

(56) References Cited

U.S. PATENT DOCUMENTS

| | | | |
|---|---|---|---|
| 7,133,833 | B1 | 11/2006 | Chone et al. |
| 7,149,734 | B2 | 12/2006 | Carlson et al. |
| 7,159,206 | B1* | 1/2007 | Sadhu et al. ................... 717/101 |
| 7,176,800 | B2 | 2/2007 | Sajkowsky |
| 7,197,740 | B2 | 3/2007 | Beringer et al. |
| 7,269,727 | B1 | 9/2007 | Mukherjee et al. |
| 7,272,816 | B2 | 9/2007 | Schulz et al. |
| 7,313,812 | B2 | 12/2007 | Robinson et al. |
| 7,350,188 | B2 | 3/2008 | Schulz |
| 7,370,335 | B1 | 5/2008 | White et al. |
| 7,467,371 | B1 | 12/2008 | Meredith et al. |
| 7,653,562 | B2 | 1/2010 | Schulz et al. |
| 7,840,934 | B2 | 11/2010 | Sayal et al. |
| 7,853,933 | B2 | 12/2010 | Coker et al. |
| 2002/0038450 | A1 | 3/2002 | Kloppmann et al. |
| 2002/0052773 | A1 | 5/2002 | Kraemer et al. |
| 2002/0091921 | A1 | 7/2002 | Kunzinger |
| 2003/0018510 | A1 | 1/2003 | Sanches |
| 2003/0046244 | A1* | 3/2003 | Shear et al. ................... 705/52 |
| 2003/0046282 | A1 | 3/2003 | Carlson et al. |
| 2003/0083923 | A1 | 5/2003 | Guicciardi et al. |
| 2003/0115468 | A1 | 6/2003 | Aull et al. |
| 2003/0172368 | A1 | 9/2003 | Alumbaugh et al. |
| 2003/0200527 | A1 | 10/2003 | Lynn et al. |
| 2004/0015818 | A1 | 1/2004 | McDonald et al. |
| 2004/0025048 | A1 | 2/2004 | Porcari et al. |
| 2004/0083448 | A1* | 4/2004 | Schulz et al. ................... 717/101 |
| 2004/0125957 | A1 | 7/2004 | Rauber et al. |
| 2004/0187089 | A1* | 9/2004 | Schulz ................... 717/101 |
| 2005/0267789 | A1 | 12/2005 | Satyadas et al. |
| 2006/0095276 | A1 | 5/2006 | Axelrod et al. |
| 2006/0253314 | A1* | 11/2006 | Reznichenko et al. ........... 705/9 |

OTHER PUBLICATIONS

Russel, et al., *Access Control for Dynamic Virtual Organisations*, Electronic Proceedings of the UK E-Science All Hands Meeting 2004, Informatics Institute, School of Computing, University of Leeds, LS2 9JT, XP002347503, pp. 1-8.

Coetzee, et al., *Virtual Enterprise Access Control Requirements*, AMC International Conference Proceedings Series, Proceedings of SAICSIT 2003, XP002347504, South Africa, vol. 47, 2003, pp. 285-294.

Welch, et al., *Security for Grid Services*, Proceedings of the 12th IEEE International Symposium on High Performance Distributed Computing, 2003, XP010643711, pp. 48-57.

Non-Final Office Action for U.S. Appl. No. 11/286,531, Mailed May 13, 2009, 32 pages.

Non-Final Office Action for U.S. Appl. No. 11/287,007, Mailed Aug. 7, 2009, 14 pages.

Non-Final Office Action for U.S. Appl. No. 11/253,085, Mailed Dec. 28, 2009, 15 pages.

Final Office Action for U.S. Appl. No. 11/286,531, Mailed Jan. 8, 2010, 21 pages.

Final Office Action for U.S. Appl. No. 11/287,007, Mailed Feb. 22, 2010, 16 Pages.

Non-Final Office Action for U.S. Appl. No. 11/287,007 Mailed May 13, 2010, 16 Pages.

Final Office Action for U.S. Appl. No. 11/253,085, Mailed Jun. 30, 2010, 11 Pages.

Notice of Allowance for U.S. Appl. No. 11/286,531, Mailed Nov. 2, 2011.

Notice of Allowance for U.S. Appl. No. 11/253,085, Mailed Jan. 4, 2012.

Brahim, M. "Business-to-business interactions: issues and enabling technologies", (Online), Jan. 6, 2006, pp. 1-27, (Retrieved on Oct. 31, 2011 from Internet) <http://delivery.acm.org/10.1145/780000/775457/30120059.pdf>.

Eckert, K. et al., "Workflow Technologies for a Virtual ISP", (Online) 2006, pp. 1-8 (Retrieved from Internet Oct. 31, 2011), <http://www.visp-project.org/docs/publications/Workflow_Technologies_for_a_Virtual_ISP.pdf>.

Karande, A. et al., "Intelligent Database for the SOA using BPEL", (Online) Feb. 2011, pp. 281-284, Retrieved on Oct. 31, 2011, <http://delivery.acm.org/10.1145/1950000/1948000/p281-karande.pdf>.

Zimmermann, O. et al., "Choreography in an Order Management Scenario", (Online), Oct. 16-20, 2005, pp. 301-312, (Retrieved Oct. 31, 2011 from Internet), <http://delivery.acm.org/10.1145/1100000/1094965/p301-zimmermann.pdf>.

* cited by examiner

AUTOMATED GENERATION OF ACCESS CONTROL POLICIES IN CROSS-ORGANIZATIONAL WORKFLOW

RELATED APPLICATION

The application is related to and hereby claims the priority benefit of European Patent Application No. 05290969.4, filed May 3, 2005, which is incorporated by reference.

FIELD OF THE INVENTION

An embodiment relates generally to the field of management of activities in a workflow processes. More particularly, an embodiment relates to a method and a system for automated generation of access control policies in a cross-organizational workflow environment

BACKGROUND OF THE INVENTION

The Internet and the World Wide Web ("Web") have changed the landscape of information delivery and affected numerous aspects of life. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects that could not be undertaken individually or to offer composed services that could not be provided by individual organizations.

A growing array of workflow automation technologies has emerged to help organizations in a collaborative environment manage activities in the workflow process. In particular, workflow management applications are designed to electronically route the right information to the right participant at the right time. It enables the flow of work between participants within the same organization or different organizations to be defined and tracked.

However, workflow management with multi-participants can be very complex. Consequently, the integrity and security of the process can be compromised. For example, a workflow management may fail to define policies to ensure proper assignment of access privileges. This problem is further aggravated with new participants constantly joining the collaborative environment. Indeed, it can become difficult to verify the identity and access privileges of the participant. In some cases, a participant may trigger the execution activity, unintended or with malicious intentions. In addition, a privileged participant may activate an activity which is already executed or is not supposed to be activated. Consequently, the integrity of the workflow process may be greatly compromised.

As established above, there is an increasing need to manage workflow processes in such collaborative environments involving multi-participants. A secured cross-organizational workflow environment enables identification of privileged participants and enforces the control over the execution of activities.

SUMMARY OF THE INVENTION

According to one aspect of the invention, there is provided a method to control an interaction of a plurality of participants in a workflow process. The method includes classifying a plurality of activities as a first type, a second type or a third type; generating a control policy based on the type of activity; and applying the control policy to determine whether a requesting participant is permitted to interact with a responding participant, wherein the activity of the requesting participant precedes the activity of the responding participant in the workflow process.

According to a further aspect of the invention, there is provided a workflow management system for controlling an interaction of a plurality of participants in a workflow process, the system comprising a policy enforcement point to accept a request for activating an activity of a responding participant; and a policy decision point to evaluate the request based on a set of access control policies.

Other features of the invention will be apparent from the accompanying drawings and from the detailed description that follows.

BRIEF DESCRIPTION OF THE DRAWINGS

An embodiment of the invention is illustrated by way of example and not limitation by the figures of the accompanying drawings, in which like references indicate similar elements and in which.

DETAILED DESCRIPTION

A method and system for delegating authority in a collaborative environment are described. In the following description, for purposes of explanation, numerous specific details are set forth in order to provide a thorough understanding of an embodiment of the invention. It will be evident, however, to one skilled in the art that the invention may be practiced without these specific details.

A workflow process defines the activities for each participant or organization in a collaborative environment. The activities represent the process which the participant has to execute to perform his part of the work in the collaboration. The workflow process specifies the order of execution of these activities and establishes their interdependencies.

Some workflow processes use an object-oriented approach to design the workflow model. The object-oriented approach tends to focus on document and data. For example, the activities in a purchasing workflow process are based on purchase order form and shipping documents. An alternative is a role-based approach which assigns activities based on the role of the participant. As a role-based approach does not consider the identity of the participants, it enables different participants with the same role to participate in the workflow process.

Figure 1:
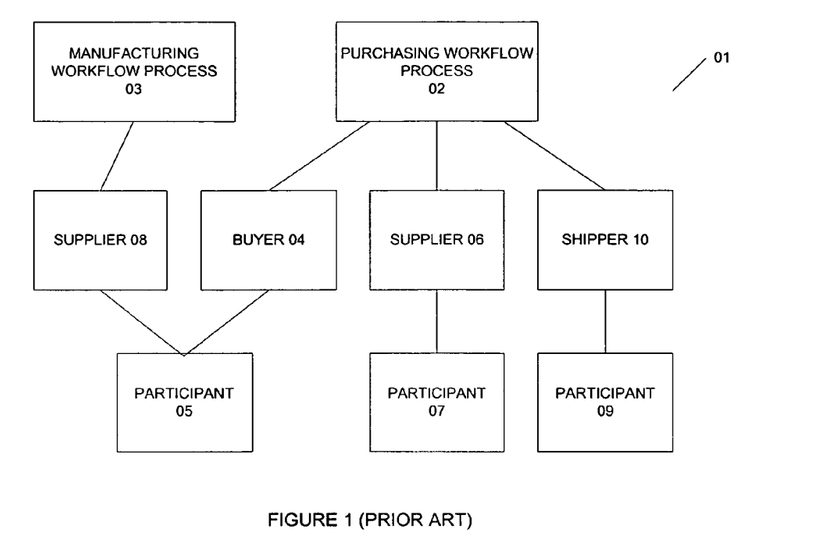
FIG. 1 is a block diagram illustrating a prior art scenario of a plurality of participants in a purchasing workflow process.

FIG. 1 illustrates a collaborative environment 01 including a purchasing workflow process 02 and a manufacturing workflow process 03. A plurality of participants 05, 07, 09 are assigned with different roles based on the workflow process. For example, participant 05 assumes the role of a buyer 04 in the purchasing workflow process 02 and the role of a supplier 08 in the manufacturing workflow process 03 respectively. Participant 07 is a supplier 06 and participant 09 is a shipper in the purchasing workflow process 02.

Figure 2:
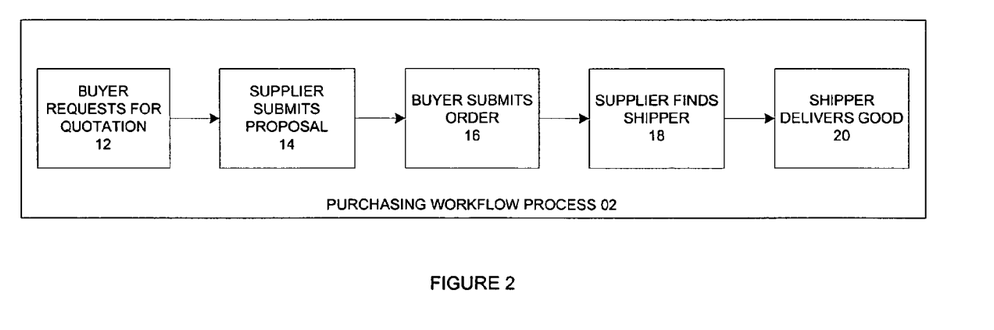
FIG. 2 is a flow chart illustrating a prior art scenario of activities in the purchasing workflow process.

FIG. 2 generally illustrates a sequence of cross-organizational activities in the purchasing workflow process 02 as presented in FIG. 1. The first activity of the workflow process 02 is initiated by the buyer 04 requesting for a quotation from supplier 06 at block 12. The supplier 06 may respond with a proposal at block 14 after which the buyer 04 provides a purchase order to the selected supplier 06 at block 16. At block 18, the supplier 06 triggers an activity to locate a shipper 10 to ship the product to the buyer 04. The last block 20 of the purchasing workflow process 02 includes the shipper 10 delivering the goods to the buyer 04.

To enable a secured cross-organizational workflow process, an exemplary embodiment of the invention uses role-based approach to enforce control over who can trigger an activity and when the activity can be executed. Participants in the workflow process own a Policy Decision Point (PDP) which determines access permission to an activity of a responding participant. The PDP includes a set of access control polices which are authorization rules relating to three major components of the workflow process. The components are the requesting activity, the responding activity and the rules which specify the ways in which the requesting activity can interact with the responding activity. For example, referring to FIG. 2, the requesting activity may be the activity 12 of a buyer 04 requesting for quotation and the responding activity 14 relates to a supplier 06 providing a proposal. The rules governing the activities 12, 14 may include verifying the qualification of the buyer 04. In one embodiment, the rules may be specified by the supplier 06. For example, the supplier 06 may require the buyer 04 to have a good payment history before permitting the buyer 04 to activate the activity 14.

In addition, activities in the workflow process have a Policy Enforcement Point (PEP) to guard the access to the activities. When the PEP of a responding activity receives an access request from the requesting activity, the PEP builds an Interaction Permission Request (IPR) and forwards the request to the PDP of the responding activity. The PDP evaluates the request according to the set of control access policies which are designed specifically for different types of activities in a workflow process. According to one embodiment of the invention, the activities of a workflow process are classified as (1) a first activity of the entire workflow process, (2) a first activity of a responding participant in the workflow process, and (3) interaction activities which are other activities that are not classified under (1) or (2). Various access control policies are established according to the type of activity so as to provide a secured cross-organizational workflow environment.

Figure 3:
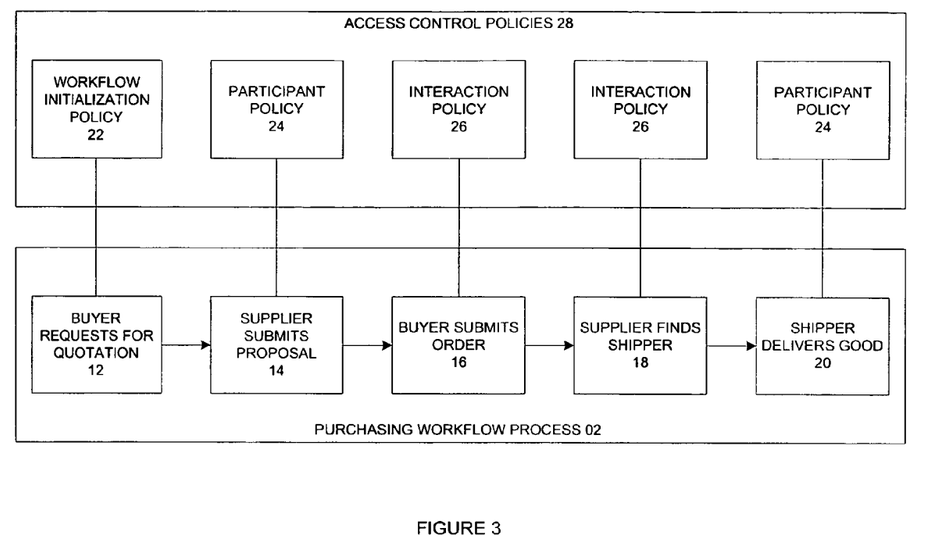
FIG. 3 is a block diagram presenting a set of access control policies that correspond to the plurality of activities in the purchase workflow process as illustrated in FIG. 2.

A workflow instance initialization policy is designed to control access privileges for the first activity of the entire workflow process. The policy determines the identity of the participant who can trigger the first activity. In addition, the policy establishes all the roles required in the workflow process. As illustrated in FIG. 3, the workflow instance initialization policy 22 is associated with the first activity 12 of the purchasing workflow process 02. The workflow instance initialization policy 22 determines that the buyer 04 has the right to activate the first activity 12 of the purchasing workflow process. In addition, other participating roles include a supplier 08 and a shipper 12. The present method uses role-based access mechanism and a participant has to enable his role as a buyer 04 before he can activate the first activity 12 of the purchasing workflow process. The workflow initialization policy 22 is designed individually for each particular workflow.

A participant policy 24 identifies the conditions for participation in an already created workflow process and more particularly, for governing the execution of the first activity of a responding participant. The participant policy determines the role of the requesting participant who can request execution of the first activity of the responding participant. In FIG. 3, the participant policy of the supplier 08 enables a requesting participant with the role of a buyer 04 to request activation of the first activity 14 of the supplier 08. However, if the requesting participant has the role of a shipper 12, the request will be denied. Similarly, the participant policy 24 associated with the first activity 20 of the shipper 10 requires the requesting participant to own the role of a supplier 08. Therefore, this participant policy prevents unauthorized or invalid participant from executing an activity in the workflow process. It ensures that only a requesting participant of the appropriate role has the authority to activate the first activity of the responding participant.

In addition, the participant policy 24 enables a responding participant to demand a trust level from the requesting participant. The trust level defines a set of requirements that a requesting participant must possess in order for the responding participant to permit activation of his first activity. The trust level may be related to the reputation and payment history of the requesting participant. Therefore, a supplier 08 who chooses not to work with a buyer 04 with poor payment history, will specify payment history as the trust level condition in the participant policy 24.

Figure 4:
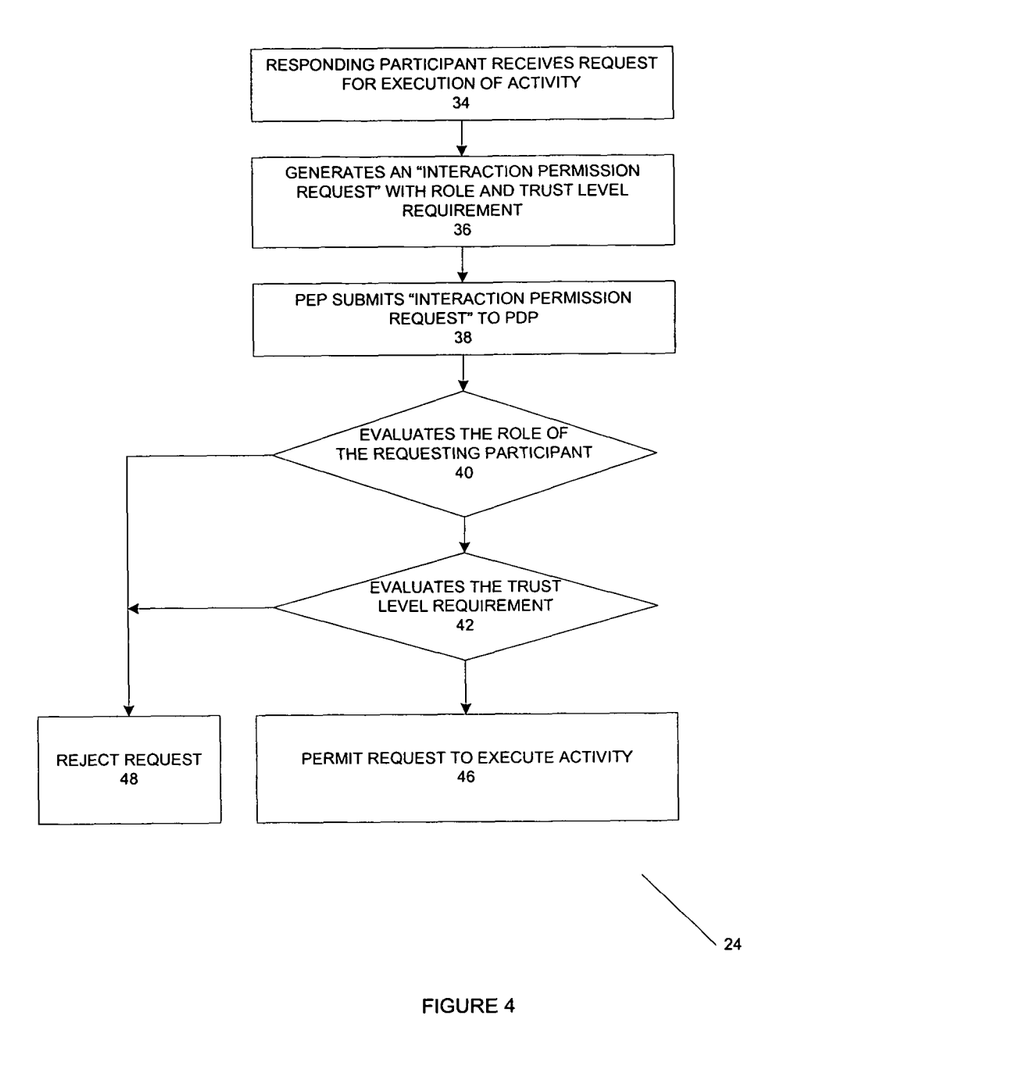
FIG. 4 is a flow chart illustrating a method, according to one exemplary embodiment of the invention, to determine if a requesting participant has a permission to activate a first activity of the responding participant.

FIG. 4 is a flow chart diagram illustrating the processes of a participant policy 24 according to one exemplary embodiment of the invention. The process begins at block 34 wherein the responding participant receives a request for execution of his first activity. Next, an "Interaction Permission Request" specifying the role and trust requirement of the requesting participant is generated at block 36. At block 38, the PEP of the responding participant forwards the Interaction Permission Request to the PDP which evaluates the role of the requesting participant at block 40 and the trust level requirement at block 42. The request to activate the activity is permitted at block 46 if the evaluations are successful. In the event that the requesting participant fails to meet the requirements, the request is rejected at block 48.

The last policy relates to control flow routing and sets the conditions for correct routing of activities in a workflow process. In particular, the interaction policy governs the interaction activities in a workflow process. The interaction policy 26 achieves the correct routing of activities by reviewing the identity of the requesting participant. It will be noted that it is the identity, and not the role of the requesting participant, that establishes the permission.

Figure 5:
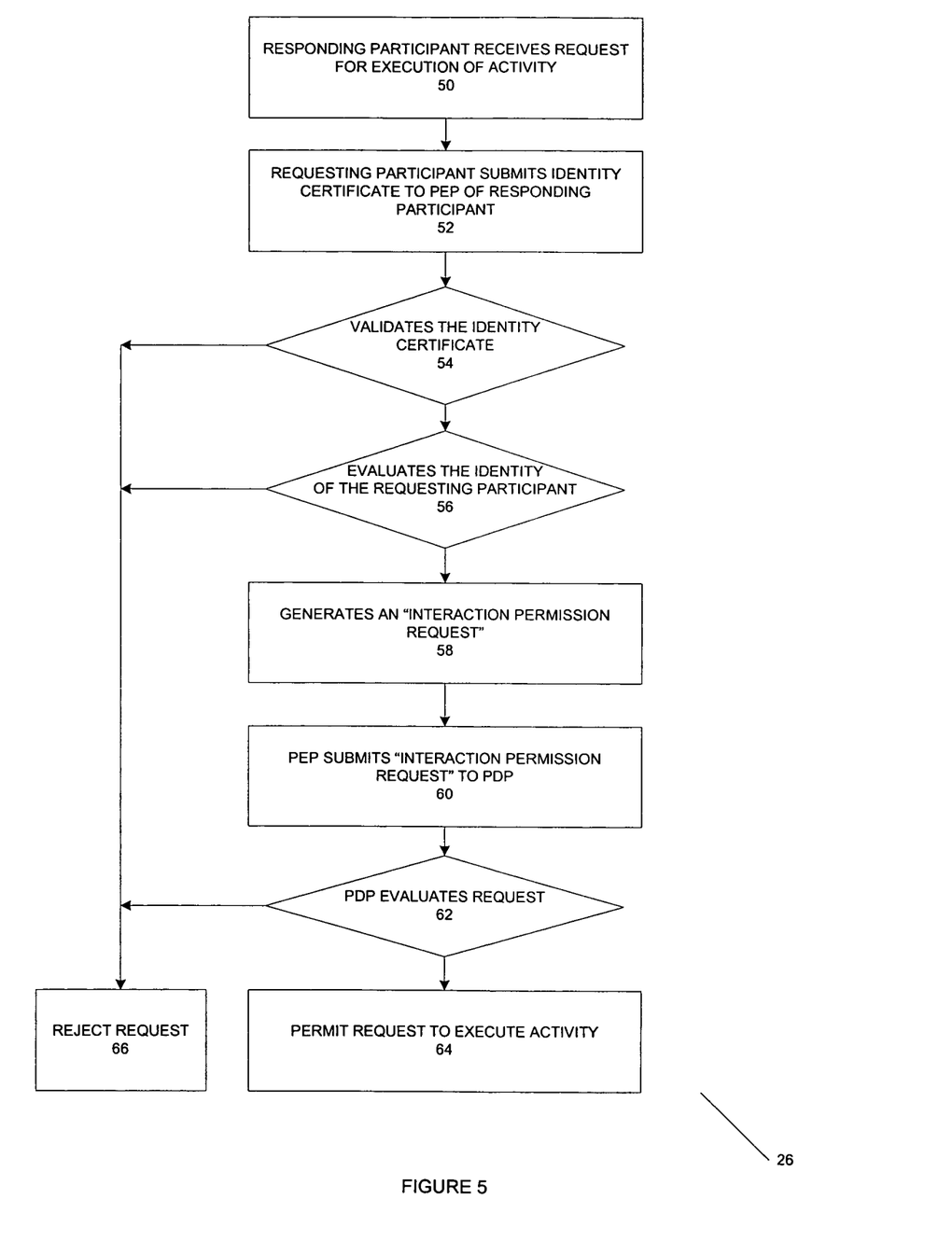
FIG. 5 is a flow chart illustrating a method, according to one exemplary embodiment of the invention, for correct routing of activities in the workflow process.

As illustrated in FIG. 5, when a responding participant receives an activation request for a particular activity at block 50, the PEP guarding this activity asks the requesting participant for his identity certificate at block 52. Next, the responding participant validates the identity certificate at block 54. If the certificate is valid, the identity of the requesting participate is further verified at block 56. The request will be rejected at block 66 if the evaluations are unsuccessful at blocks 54 or 56. At block 58, the PEP of the responding participant generates an "Interaction Permission Request" for the activity. The "Interaction Permission Request" includes the identity of the requesting participant and the identity of the responding activity. The request is sent by the PEP to the PDP of the responding participant at block 60. The PDP permits the activation of the activity at block 64 after evaluating the request at block 62. The request is permitted only if the name of the requestor and the identity of the activity match the identities as indicated in the interaction policy.

Figure 6:
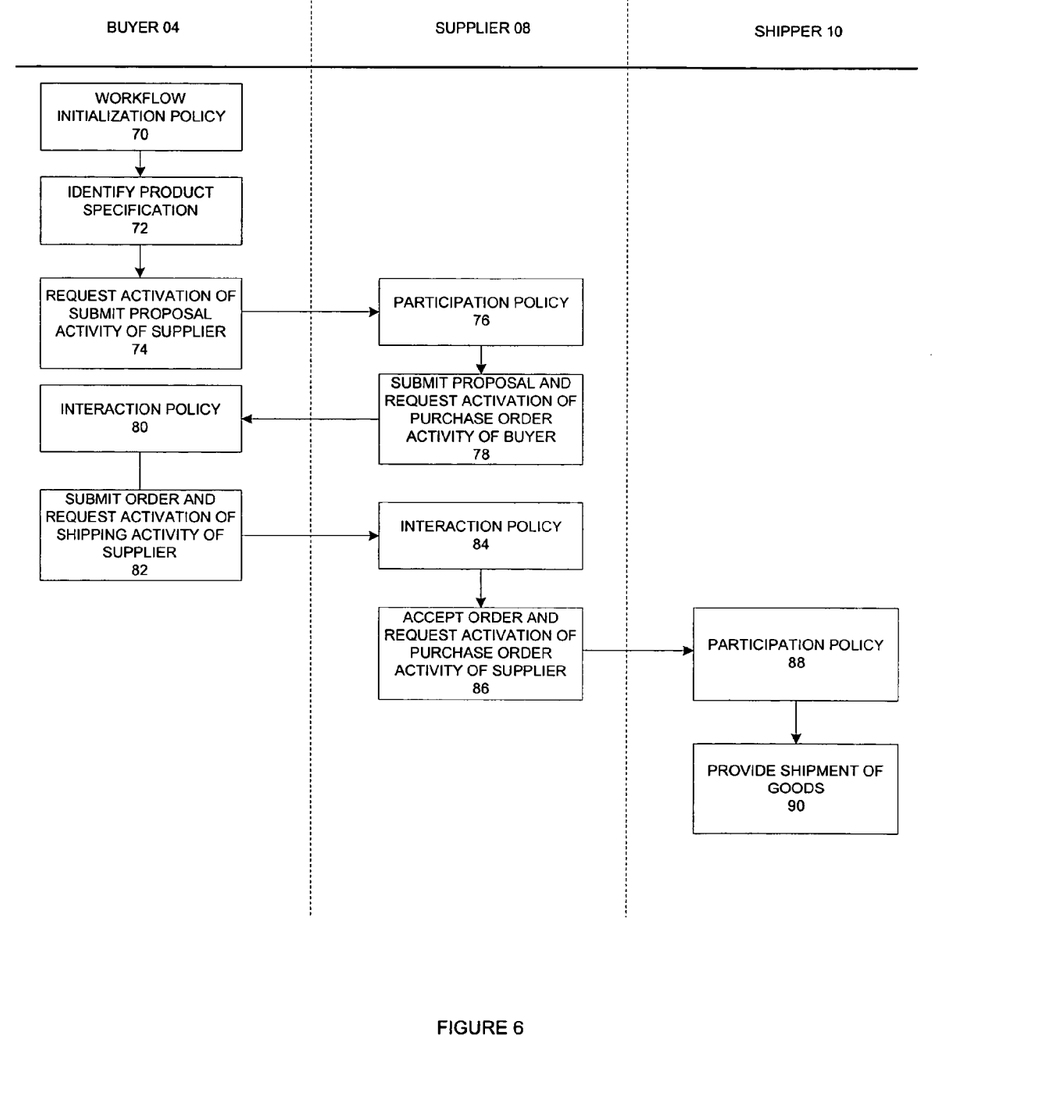
FIG. 6 is an interaction flow chart illustrating the activities of a buyer, a supplier and a shipper in the purchasing workflow process, according to one exemplary embodiment of the invention.

FIG. 6 is an interaction flow diagram illustrating the interaction among the buyer 04, the supplier 08 and the shipper 10 in a purchasing workflow process. The process begins at block 70 where the workflow initialization policy 22 determines that the buyer 04 is permitted to activate the workflow process. Block 72 is a private activity of the buyer 04 wherein the buyer 04 identifies the product specification of the goods that is to be purchased in this workflow. Next, at block 74, the buyer 04 requests activation of the first activity belonging to the supplier 08. In this example, the activity is to provide a proposal to the buyer 04. When the supplier 08 receives this request at block 76, the participation policy 24 is employed to determine if the buyer 04 owns the appropriate role. In addition, the minimum trust level requirement is evaluated. If the buyer 04 meets all the conditions as specified in the participation policy 24, the supplier 08 submits the proposal at block 78. In addition, the supplier 08 requests activation of the buyer's activity to provide a purchase order. When the buyer 04 receives the request at block 80, interaction policy 26 is employed to verify the request. The interaction policy 26 includes evaluating the identity of the supplier 08. The buyer 04 submits the purchase order to the supplier at block 82. In addition, the buyer 04 requests the activation of the supplier's activity of shipping the goods. This request is evaluated by the interaction policy 26 of the supplier 08 at block 84. If the request is permitted, the supplier 08 accepts the purchase order. At this point, the supplier 08 requests activation of the first activity of the shipper 10. The shipper 10 employs participation policy 24 at block 88 to determine if the request is permitted. The shipper 10 completes the process with the shipment of goods at block 90.

In another exemplary embodiment, the set of access control policies can be applied to a multi-participant environment whereby a requesting participant may not be familiar with all the responding participants in the collaborative environment. Referring to FIG. 3, the buyer 04 may request activating the activity 14 of all the participants who has the role of a supplier 08. At this stage, the buyer 04 is not concerned with the qualifications of the responding participants. Instead, the buyer 04 is using the workflow process to discover new responding participants whom the buyer 04 had not previously worked before. In the next stage, the responding participants may reject the request using the participant policy to verify the request. In particular, the trust level condition may indicate that the buyer 04 does not have permission to make the request. For example, the supplier 08 may indicate in his trust level condition that the buyer 04 has to be from certain field of industry. Therefore, only appropriate supplier 08 will respond to the request of the buyer 04.

In addition, the buyer 04 may also incorporate a minimum trust level condition in the interaction policy 26 relating to the following activity 16. This enables the buyer 04 to further filter the qualifications of the numerous suppliers before narrowing down to a group of suppliers for further evaluation. Accordingly, the buyer 04 is able to discover new suppliers 08 effortlessly.

Figure 7:
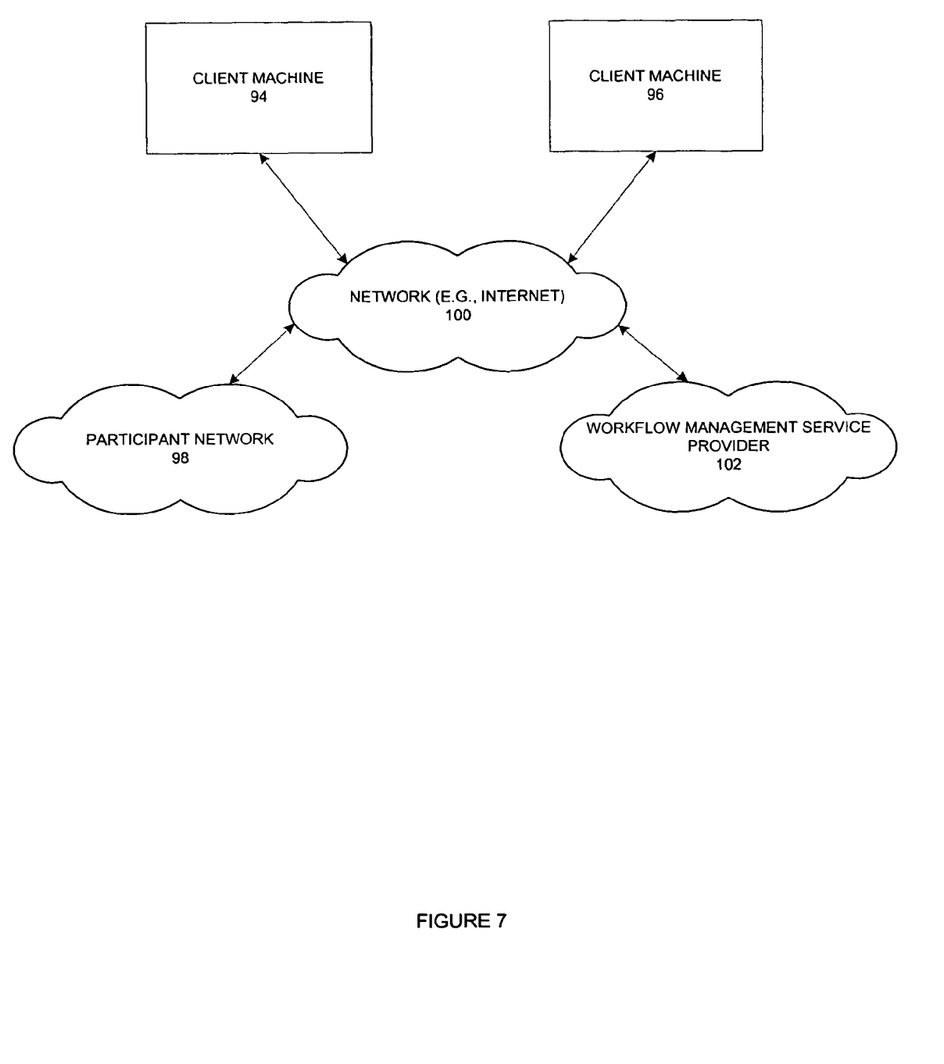
FIG. 7 is a block diagram illustrating a system, according to one embodiment of the invention, to manage workflow process in a multi-participants environment.

FIG. 7 is a network diagram depicting a workflow management system 106, according to one exemplary embodiment of the invention. The workflow management system 106 resides at a service provider 102 which provides management services via a network 100 (e.g., the Internet). Participants are connected to the network 100 via client machines 94, 96 or office network 98. Although the workflow management system 106 is hosted at a service provider 102 as illustrated in FIG. 7, it will be evident to one ordinarily skilled in the art that other setups may be practiced. For example, the workflow management system 106 may be hosted at a participant's office network 98.

Figure 8:
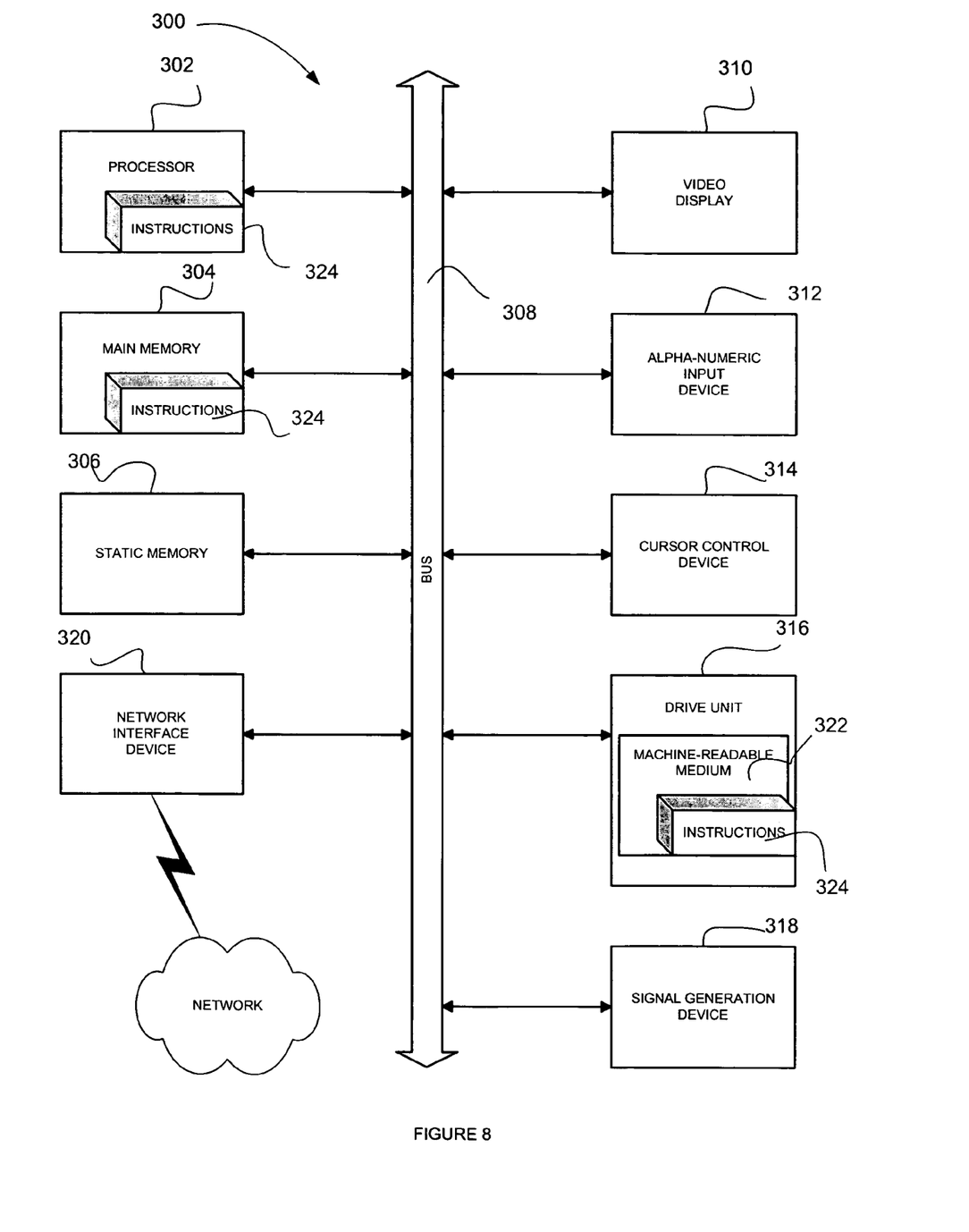
FIG. 8 is a block diagram illustrating a machine, in the exemplary form of a computer system, that stores a set of instructions for causing the machine to perform any of the methodologies discussed herein.

FIG. 8 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 392 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the invention. The term "machine-readable medium" shall accordingly be taken to include, but not be limited to, solid-state memories, optical and magnetic media, and carrier wave signals.

Thus, a method and system to delegate authority in an online collaborative environment has been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for controlling an interaction of a plurality of participants in a workflow process of a network system, the method comprising:
    classifying each activity of a plurality of activities by a workflow server machine as one of a requesting activity, a responding activity, and an interaction activity, wherein each activity is associated with a participant from the plurality of participants in the workflow process, the plurality of participants being client machines operating as requesting participants or responding participants;
    generating a control policy for each of the participant of the plurality of participants according to the classification of the activity for that participant, wherein the generated control policy includes:
        an interaction policy for routing an activity classified as the interaction activity of a participant, and
        a participant policy to identify conditions for execution of the activity of a participant,
        wherein routing of the activity is based on an identity of a requesting participant and an identity of a responding activity in accordance with permissible identities of requesting participants and responding activities indicated in the interaction policy, and
        wherein the conditions for execution of the activity is based on a role and trust level of the requesting participant in accordance with permissible roles and trust levels specified in the responding participant policy;
    receiving, via a network coupled to the workflow server machine and client machines, at a policy enforcement point of the responding participant, a request to interact from the requesting participant;
    forwarding via the network the request from the policy enforcement point to a policy decision point of the responding participant, wherein forwarding the request comprises:
        determining the identity of the requesting participant, including a name of the requesting participant,
        determining the identity of the responding activity,
        verifying the identity of the requesting participant, and
        forwarding the request along with the verified identity of the requesting participant and the identity of the responding activity;
    evaluating the forwarded request at the policy decision point by applying the responding participant policy to determine whether the requesting participant is permitted to interact with the responding participant, wherein the requesting activity of the requesting participant precedes the responding activity of the responding participant in the workflow process, wherein evaluating the forwarded request comprises:
        permitting the forwarded request to be evaluated when the name of the requesting participant and the identity of the responding activity match a permissible name and a permissible identity indicated in the interaction policy;
        determining the role of the requesting participant;
        determining the trust level of the requesting participant, wherein the trust level is associated with a payment history and reputation of the requesting participant; and
        granting permission to activate the responding activity based on the:
            role of the requesting participant,
            verified identity of the requesting participant, and
            trust level of the requesting participant in accordance with the responding participant policy; and
    providing via the network the requesting participant with a decision to interact with the responding participant, including notifying the requesting participant about granting permission to activate the responding activity in accordance with the responding participant policy.

2. The method of claim 1, wherein the trust level of the requesting participant is a qualification of the requesting participant as specified in the responding participant policy.

3. The method of claim 1, wherein verifying the identity of the requesting participant is:
    verifying an identity certificate of the requesting participant.

4. The method of claim 1, wherein the participant policy determines a role of the requesting participant to execute the requesting activity by the responding participant.

5. The method of claim 1, wherein the participant policy to enable the responding participant to demand a trust level from the requesting participant.

6. A network system for controlling an interaction of a plurality of participants in a workflow process, the system comprising:
    means for classifying each activity of a plurality of activities by a workflow server machine as one of a requesting activity, a responding activity, and an interaction activity, wherein each activity is associated with a participant from the plurality of participants in the workflow process, the plurality of participants being client machines, the client machines operating as requesting participants or responding participants;
    means for generating a control policy for each of the participant of the plurality of participants according to the classification of the activity for that participant, wherein the generated control policy includes:
        an interaction policy for routing an activity classified as the interaction activity of a participant, and
        a participant policy to identify conditions for execution of the activity of a participant,
        wherein routing of the activity is based on an identity of a requesting participant and an identity of a responding activity in accordance with permissible identities of requesting participants and responding activities indicated in the interaction policy, and
        wherein the conditions for execution of the activity is based on a role and trust level of the requesting participant in accordance with permissible roles and trust levels specified in the responding participant policy;
    means for receiving, via a network coupled to the workflow server machine and client machines, at a policy enforcement point of the responding participant, a request to interact from the requesting participant;
    means for forwarding via the network the request from the policy enforcement point to a policy decision point of the responding participant, wherein the means for forwarding the request comprises:
  means for determining the identity of the requesting participant, including a name of the requesting participant
  means for determining the identity of the responding activity,
  means for verifying the identity of the requesting participant, and
  means for forwarding the request along with the verified identity of the requesting participant and the identity of the responding activity;
means for evaluating the forwarded request at the policy decision point by means for applying the responding participant policy to determine whether the requesting participant is permitted to interact with the responding participant, wherein the requesting activity of the requesting participant precedes the responding activity of the responding participant in the workflow process, wherein means for evaluating the forwarded request comprises:
  means for permitting the forwarded request to be evaluated when the name of the requesting participant and the identity of the responding activity match a permissible name and a permissible identity indicated in the interaction policy;
  means for determining the role of the requesting participant; and
  means for determining the trust level of the requesting participant, wherein the trust level is associated with a payment history and reputation of the requesting participant; and
  means for granting permission to activate the responding activity based on the:
    role of the requesting participant,
    verified identity of the requesting participant, and
    trust level of the requesting participant in accordance with the responding participant policy; and
  means for providing via the network the requesting participant with a decision to interact with the responding participant, including means for notifying the requesting participant about granting permission to activate the responding activity in accordance with the responding participant policy.

7. The system of claim 6, wherein the trust level of the requesting participant is a qualification of the requesting participant as specified in the responding participant policy.

8. The system of claim 6, wherein the means for verifying the identity of the requesting participant is:
  means for verifying an identity certificate of the requesting participant.

9. The system of claim 6, wherein the participant policy for determining a role of the requesting participant to execute the requesting activity by the responding participant.

10. The system of claim 6, wherein the participant policy to enable the responding participant to demand a trust level from the requesting participant.

11. A non-transitory machine-readable storage medium comprising instructions, which when executed by a machine, cause the machine to perform a method for controlling an interaction of a plurality of participants in a workflow process of a network system, the method comprising:
  classifying each activity of a plurality of activities by a workflow server machine as one of a requesting activity, a responding activity, and an interaction activity, wherein each activity is associated with a participant from the plurality of participants in the workflow process, the plurality of participants being client machines operating as requesting participants or responding participants;
  generating a control policy for each of the participant of the plurality of participants according to the classification of the activity for that participant, wherein the generated control policy includes:
    an interaction policy for routing an activity classified as the interaction activity of a participant,
    a participant policy to identify conditions for execution of the activity of a participant,
    wherein routing of the activity is based on an identity of a requesting participant and an identity of a responding activity in accordance with permissible identities of requesting participants and responding activities indicated in the interaction policy, and
    wherein the conditions for execution of the activity is based on a role and trust level of the requesting participant in accordance with permissible roles and trust levels specified in the responding participant policy;
  receiving, via a network coupled to the workflow server machine and client machines, at a policy enforcement point of the responding participant, a request to interact from the requesting participant;
  forwarding via the network the request from the policy enforcement point to a policy decision point of the responding participant, wherein forwarding the request comprises:
    determining the identity of the requesting participant,
    determining the identity of the responding activity,
    verifying the identity of the requesting participant, and
    forwarding the request along with the verified identity of the requesting participant and the identity of the responding activity;
  evaluating the forwarded request at the policy decision point by applying the responding participant policy to determine whether the requesting participant is permitted to interact with the responding participant, wherein the requesting activity of the requesting participant precedes the responding activity of the responding participant in the workflow process, wherein evaluating the forwarded request comprises:
    permitting the forwarded request to be evaluated when the identities of the requesting participant and the responding activity match permissible identities indicated in the interaction policy;
    determining the role of the requesting participant;
    determining the trust level of the requesting participant, wherein the trust level is associated with a payment history and reputation of the requesting participant; and
    granting permission to activate the responding activity based on the:
      role of the requesting participant,
      verified identity of the requesting participant, and
      trust level of the requesting participant in accordance with the responding participant policy; and
  providing via the network the requesting participant with a decision to interact with the responding participant, including notifying the requesting participant about granting permission to activate the responding activity in accordance with the responding participant policy.

12. The non-transitory machine-readable storage medium of claim 11, wherein the trust level of the requesting participant is a qualification of the requesting participant as specified in the responding participant policy.

13. The non-transitory machine-readable storage medium of claim 11, wherein verifying the identity of the requesting participant is:
verifying a identity certificate of the requesting participant.

14. The non-transitory machine-readable storage medium of claim 11, wherein the participant policy determines a role of the requesting participant to execute the requesting activity by the responding participant.

15. The non-transitory machine-readable storage medium of claim 11, wherein the participant policy to enable the responding participant to demand a trust level from the requesting participant.

\* \* \* \* \*